US011223600B2

(12) United States Patent
Zhao et al.

(10) Patent No.: US 11,223,600 B2
(45) Date of Patent: Jan. 11, 2022

(54) MAC ADDRESS SYNCHRONIZATION METHOD

(71) Applicants: Self Electronics Co., Ltd., Zhejiang (CN); Wanjiong Lin, Zhejiang (CN); Self electronics USA Corporation, Norcross, GA (US)

(72) Inventors: Pengyuan Zhao, Zhejiang (CN); Shuaiwei Wu, Zhejiang (CN); Jiayun Dai, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 155 days.

(21) Appl. No.: 16/691,187

(22) Filed: Nov. 21, 2019

(65) Prior Publication Data

US 2020/0169532 A1 May 28, 2020

(30) Foreign Application Priority Data

Nov. 28, 2018 (CN) .......................... 201811433495.1

(51) Int. Cl.
*H04L 29/12* (2006.01)
*H04L 29/06* (2006.01)

(52) U.S. Cl.
CPC ...... *H04L 61/6022* (2013.01); *H04L 61/1535* (2013.01); *H04L 61/2069* (2013.01); *H04L 63/083* (2013.01); *H04L 63/0876* (2013.01)

(58) Field of Classification Search
CPC ... H04L 12/413; H04L 12/2838; H04L 29/06; H04L 49/90; H04L 49/901; H04L 61/1535; H04L 61/2038; H04L 61/2053; H04L 61/2069; H04L 61/6022; H04L 61/6077; H04L 63/083; H04L 63/0876; H04L 69/18; H04L 69/32; H04L 69/324; H04W 74/00

See application file for complete search history.

(56) References Cited

U.S. PATENT DOCUMENTS

| | | | | |
|---|---|---|---|---|
| 2003/0063593 A1* | 4/2003 | Koyanagi | ............. | H04W 28/06 370/338 |
| 2005/0165909 A1* | 7/2005 | Cromer | .................. | H04W 8/18 709/219 |
| 2008/0209071 A1* | 8/2008 | Kubota | ............... | H04L 61/6022 709/238 |
| 2016/0360594 A1* | 12/2016 | Chemel | ................ | H05B 47/115 |

* cited by examiner

*Primary Examiner* — Marsha D Banks Harold
*Assistant Examiner* — Dharmesh J Patel
(74) *Attorney, Agent, or Firm* — Wang Law Firm, Inc.

(57) ABSTRACT

The invention discloses a MAC address synchronization method for synchronizing a MAC address of a WIFI module and an Ethernet module on a smart host, comprising the intelligent terminal acquires the MAC address of the WIFI module; the intelligent terminal sends the obtained MAC address to the control module through the WIFI module; the control module writes the received MAC address to the Ethernet module. The invention makes the Ethernet module have the same MAC address as the WIFI module. When the smart host accesses the cloud through the WIFI and the Ethernet respectively, the WIFI module and the Ethernet module have the same MAC address.

6 Claims, 2 Drawing Sheets

MAC ADDRESS SYNCHRONIZATION METHOD

RELATED APPLICATION

This application claims priority to a Chinese Patent Application No. CN 201811433495.1, filed on Nov. 28, 2018.

FIELD OF THE TECHNOLOGY

The present invention relates to smart equipment field, with particular emphasis on a MAC address synchronization method.

BACKGROUND OF THE INVENTION

Currently, intelligent hosts with WIFI and Ethernet communication modes on the market have different MAC addresses when connected to the cloud through WIFI and Ethernet respectively, so, the same smart host will be registered as two different devices because of different MAC addresses when they access the cloud through different ways of communication modes, which will bring inconvenience to the information management of devices accessing the cloud.

BRIEF SUMMARY OF THE INVENTION

In view of this, it is necessary to provide a MAC address synchronization method to overcome the above disadvantages.

A MAC address synchronization method provided by the present invention, for synchronizing a MAC address of a WIFI module and an Ethernet module on a smart host, comprising:

the intelligent terminal acquires the MAC address of the WIFI module;

the intelligent terminal sends the obtained MAC address to the control module through the WIFI module;

the control module writes the received MAC address to the Ethernet module.

Advantageously, further comprising the following steps before the intelligent terminal acquires the MAC address of the WIFI module:

connect the intelligent terminal to the specified network;

the control module enters a MAC address synchronization mode, and the control module sends instructions to the WIFI module to make the WIFI module enter a state that can be discovered by the intelligent terminal;

after discovering the WIFI module, the intelligent terminal sends the information of the specified network to the WIFI module, and then the WIFI module connects to the specified network;

the intelligent terminal searches for the WIFI module, and the intelligent terminal acquires the MAC address of the WIFI module after the intelligent terminal searches for the WIFI module.

Advantageously, the control module is connected to an input module through which instructions are sent to the control module to make the control module enter MAC address synchronization mode.

Advantageously, the input module is a button or a key.

Advantageously, the information of the specified network comprises name and password of the network.

Advantageously, the control module is connected to an alarm module, and after the control module writes the acquired MAC address to the Ethernet module, it also includes the steps to verify the MAC address written to the Ethernet module.

Advantageously, the step of verifying the MAC address written to the Ethernet module comprises:

the control module reads the MAC address of the Ethernet module;

determine whether the MAC address read by the control module from the Ethernet module is the same as the MAC address written by the control module to the Ethernet module, if yes, the control module sends the MAC address synchronization success information to the intelligent terminal through the WIFI module, and the control module exit the MAC address synchronization mode; if not, the control module rewrites the MAC address to the Ethernet module and increments the number of MAC address writes of the Ethernet module by 1, and then the control module reads the MAC address of the Ethernet module, and then determine whether the MAC address read by the control module from the Ethernet module is the same as the MAC address written to the Ethernet module, and then performs the same operation according to the above method according to the judgment result, if the MAC address read by the control module from the Ethernet module is still different from the MAC address written by the control module to the Ethernet module after the control module has written the MAC address to the Ethernet module for several times, the control module sends commands to the alarm module, and the alarm module alarms.

Advantageously, the several times is three times.

Compared with the prior art, the present invention acquires the MAC address of the WIFI module through the intelligent terminal, and then the intelligent terminal sends the MAC address of the WIFI module to the control module, and then the control module writes the MAC address of the WIFI module to the Ethernet module, so that the Ethernet module has the same MAC address as the WIFI module. When the smart host accesses the cloud through WIFI or Ethernet respectively, the WIFI module and the Ethernet module will have the same MAC address, so that the same smart host via Ethernet and WIFI, the two different communication methods, with the same MAC address access the cloud, it was registered as a device, thereby facilitating information management of devices accessing the cloud.

BRIEF DESCRIPTION OF THE DRAWINGS

The drawings described herein are intended to promote a further understanding of the present invention, as follows.

DETAILED DESCRIPTION OF THE INVENTION

The present application is illustrated by way of the following detailed description based on of the accompanying drawings. It should be noted that illustration to the embodiment in this application is not intended to limit the invention.

Figure 1:
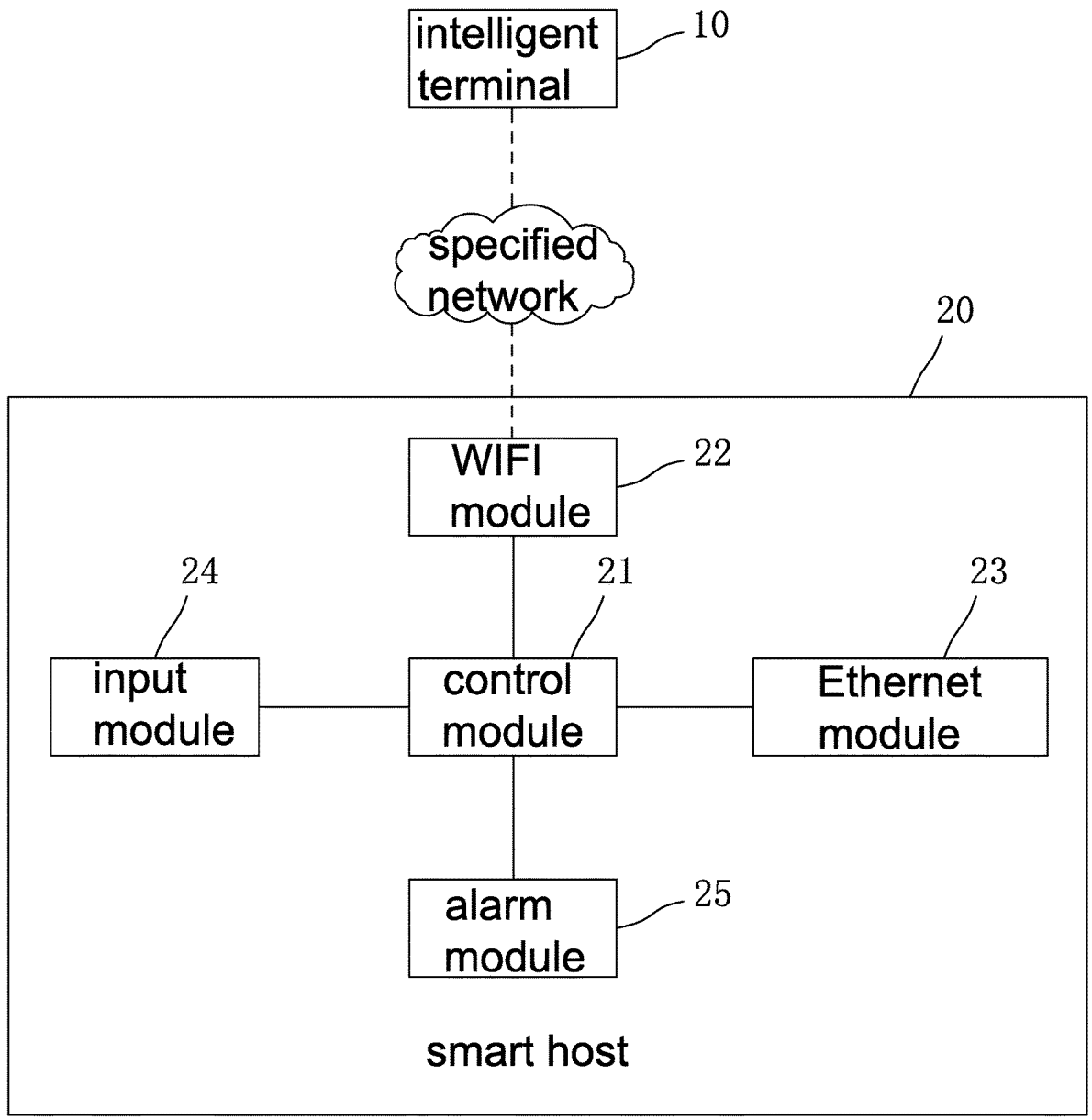
FIG. 1 is a schematic diagram showing the circuit structure for implementing MAC address synchronization method of the present invention.

As shown in FIG. 1, the smart host 20 comprises control module 21, WIFI module 22, Ethernet module 23, input module 24, and alarm module 25. The WIFI module 22, the Ethernet module 23, the input module 24 and the alarm module 25 are electrically connected with the control module 21, and the main control chip of the smart host 20 comprises the control module 21; the input module 24 is any device that can send a signal to the control module by human operation. In this embodiment, the input module 24 is a key, of course, the input module 24 can also be sound sensor, infrared sensor, touch sensor, etc.; the WIFI module 22 is used for the smart host 20 to connect the WIFI network, the Ethernet module 23 is used for the smart host 20 to connect the Ethernet; the alarm module 25 can be a buzzer, sound and light alarm and other alarm equipment.

The smart terminal 10 is a smart phone or a computer in which an application for implementing the control functions required in the embodiment is installed.

Figure 2:
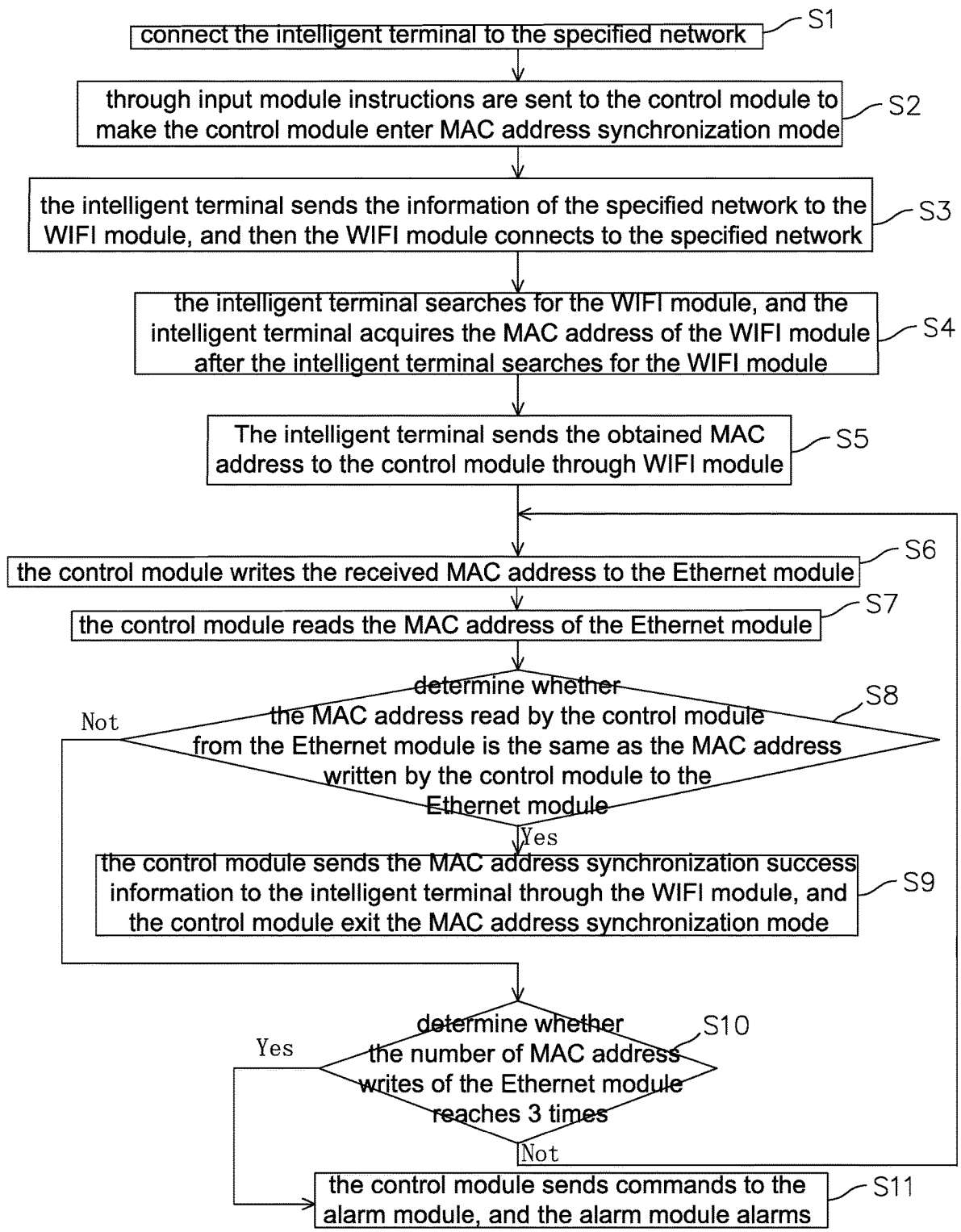
FIG. 2 is a flow chart of MAC address synchronization method of the present invention.

The MAC address synchronization method of this embodiment is used to synchronize the MAC address of the WIFI module and the Ethernet module on the smart host. As shown in FIG. 2, the MAC address synchronization method in this embodiment comprises the following steps:

S1: Connect the intelligent terminal to the specified network, which can be any local area network (LAN).

S2: the input module sends instructions to the control module by operating the input module. When the input module is a button, press the button to send an instruction to the control module. When the input module is a sensor such as the sound sensor, the infrared sensor, the touch sensor, etc., the sensor is triggered to make it to send an instruction to the control module; this instruction makes the control module to enter the MAC address synchronization mode. After the control module enters the MAC address synchronization mode, the control module sends an instruction to the WIFI module to make the WIFI module to enter a state that can be discovered by the intelligent device. After the WIFI module enters the state that can be discovered by the intelligent terminal, even if the WIFI module is not in the same LAN as the intelligent device, the WIFI module can still be discovered by the intelligent terminal.

S3: After discovering the WIFI module, the intelligent terminal sends the information of the specified network to the WIFI module, where the information of the specified network comprises the name and password of the network. After receiving the information of the specified network, the WIFI module connects to the specified network according to the information. After the WIFI module is connected to the specified network, the WIFI module and the intelligent terminal are in the same LAN, and the WIFI module and the intelligent terminal in the same LAN can transmit information to each other.

S4: The intelligent terminal searches for the WIFI module. Since the intelligent terminal and the WIFI module are in the same LAN, the intelligent terminal can search for the WIFI module. After the intelligent terminal searches for the WIFI module, the intelligent terminal obtains the MAC address of the WIFI module.

S5: The intelligent terminal sends the MAC address obtained in S4 to the control module through the WIFI module.

S6: The control module writes the received MAC address to the Ethernet module.

S7: The control module reads the MAC address of the Ethernet module.

S8: Determine whether the MAC address read by the control module from the Ethernet module is the same as the MAC address written by the control module to the Ethernet module, that is, whether the MAC address is successfully written by the Ethernet module through this step. If the MAC address read by the control module from the Ethernet module is the same as the MAC address written by the control module to the Ethernet module, it indicates that the MAC address of the Ethernet module is successfully written, and then S9 is performed; if the MAC address read by the control module from the Ethernet module is different from the MAC address written by the control module to the Ethernet module, it indicates that the MAC address of the Ethernet module is not successfully written, and then S10 is performed.

S9: The control module sends the information indicating the MAC address is successfully synchronized to the intelligent device through WIFI module, and the control module exits the synchronization mode of MAC address.

S10: Determine whether the number of MAC address writes of the Ethernet module reaches 3 times. If yes, perform S11, if not, perform S6, that is, the control module rewrites the MAC address received in S4 to the Ethernet module, and increases the number of MAC address writes of the Ethernet module by 1.

S11: The control module sends a command to the alarm module, and the alarm module alarms to inform the operator that the hardware (such as the Ethernet module) in the intelligent host is damaged and cannot write the MAC address normally.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. A MAC address synchronization method for synchronizing a MAC address of a WIFI module and an Ethernet module on a smart host, comprising:
    connecting an intelligent terminal with a control module to a specified network;
    the control module is connected to an input module, the control module capable of entering a MAC address synchronization mode when instructions are received from the input module, and the control module sends instructions to the WIFI module to make the WIFI module enter a state that can be discovered by the intelligent terminal;
    after discovering the WIFI module, the intelligent terminal sends the information of the specified network to the WIFI module, and the WIFI module connects to the specified network;
    the intelligent terminal searches for the WIFI module, and the intelligent terminal acquires the MAC address of the WIFI module after the intelligent terminal searches for the WIFI module;
    the intelligent terminal sends the obtained MAC address to the control module through the WIFI module;
    the control module writes the received MAC address to the Ethernet module.

2. The MAC address synchronization method as claimed in claim 1, wherein the input module is a button or a key.

3. The MAC address synchronization method as claimed in claim 1, wherein the information of the specified network comprises name and password of the network.

4. A MAC address synchronization method for synchronizing a MAC address of a WIFI module and an Ethernet module on a smart host, comprising:
    connecting an intelligent terminal with a control module to a specified network;

the control module is capable of entering a MAC address synchronization mode, and the control module sends instructions to the WIFI module to make the WIFI module enter a state that can be discovered by the intelligent terminal;

after discovering the WIFI module, the intelligent terminal sends the information of the specified network to the WIFI module, and the WIFI module connects to the specified network;

the intelligent terminal searches for the WIFI module, and the intelligent terminal acquires the MAC address of the WIFI module after the intelligent terminal searches for the WIFI module;

the intelligent terminal sends the obtained MAC address to the control module through the WIFI module;

the control module writes the received MAC address to the Ethernet module, wherein the control module is connected to an alarm module, and after the control module writes the acquired MAC address to the Ethernet module, the alarm module also includes steps to verify the MAC address written to the Ethernet module.

5. The MAC address synchronization method as claimed in claim 4, wherein the step of verifying the MAC address written to the Ethernet module comprises:

the control module reads the MAC address of the Ethernet module;

determine whether the MAC address read by the control module from the Ethernet module is the same as the MAC address written by the control module to the Ethernet module, if yes, the control module sends the MAC address synchronization success information to the intelligent terminal through the WIFI module, and the control module exit the MAC address synchronization mode; if not, the control module rewrites the MAC address to the Ethernet module and increments the number of MAC address writes of the Ethernet module by 1, and then the control module reads the MAC address of the Ethernet module, and then determine whether the MAC address read by the control module from the Ethernet module is the same as the MAC address written to the Ethernet module, and then performs the same operation according to the above method according to the judgment result, if the MAC address read by the control module from the Ethernet module is still different from the MAC address written by the control module to the Ethernet module after the control module has written the MAC address to the Ethernet module for several times, the control module sends commands to the alarm module, and the alarm module alarms.

6. The MAC address synchronization method as claimed in claim 5, wherein the several times is three times.

* * * * *